United States Patent [19]

Petrovic et al.

[11] Patent Number: 5,000,896

[45] Date of Patent: Mar. 19, 1991

[54] MOLYBDENUM DISILICIDE MATRIX COMPOSITE

[75] Inventors: John J. Petrovic; David H. Carter; Frank D. Gac, all of Los Alamos, N. Mex.

[73] Assignee: The United States of America as represented by the United States Department of Energy, Washington, D.C.

[21] Appl. No.: 493,642

[22] Filed: Mar. 15, 1990

Related U.S. Application Data

[62] Division of Ser. No. 362,112, Jun. 5, 1989, Pat. No. 4,927,792.

[51] Int. Cl.[5] .................. C04B 35/56; C04B 35/58
[52] U.S. Cl. .................................. 264/86; 501/92; 264/325; 264/332
[58] Field of Search ............ 501/92, 95; 264/65, 264/86, 325, 332

[56] References Cited

U.S. PATENT DOCUMENTS 4,543,345  9/1985  Wei .............................. 501/95

OTHER PUBLICATIONS

D. H. Carter, et al., "Mechanical Characterization of SiC Whisker-Reinforced MoSi$_2$," Ceramic Materials & Components for Engines, Proceedings of the Third International Symposium, Las Vegas, Nevada, Nov. 27-30, 1988, pp. 977-986.

D. H. Carter et al., "SiC-MoSi$_2$ Composites," Ceram. Eng. Sci. Proc. 10, pp. 112-1129 (1989).

Gac, et al., "Feasibility of a Composite of SiC Whiskers in an MoSi$_2$ Matrix", Commun. of the Am. Ceramic Soc. 68, No. 8, pp. C-200-201 (Aug. 1985).

Carter, et al., "Crack Deflection as a Toughening Mechanism in SiC-Whisker-Reinforced MoSi$_2$", Commun. of the Am. Ceramic Soc., 70, No. 4, pp. C-7-9-81 (Apr. 1987).

Gibbs, et al., "SiC Whiskers-MoSi$_2$Matrix Composites", Ceram. Eng. Sci. Proc. 8(7-8), pp. 645-648 (1987).

Primary Examiner—Mark L. Bell
Attorney, Agent, or Firm—Richard J. Cordovano; Paul D. Gaetjens; William R. Moser

[57] ABSTRACT

A composition consisting of an intermetallic compound, molybdenum disilicide, which is reinforced with VS silicon carbide whiskers dispersed throughout it and a method of making the reinforced composition. Use of the reinforcing material increases fracture toughness at low temperatures and strength at high temperatures, as compared to pure molybdenum disilicide.

6 Claims, 1 Drawing Sheet

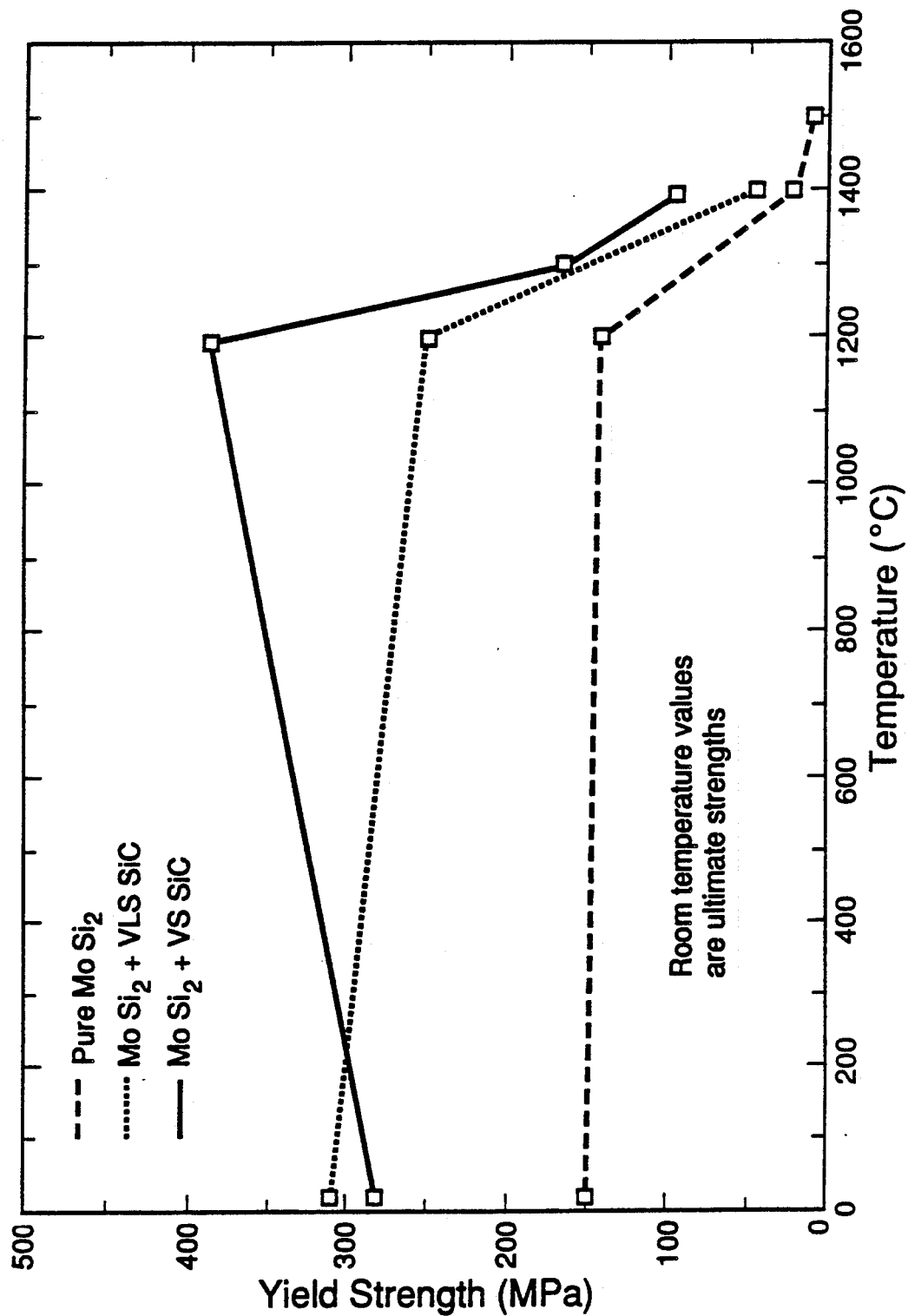

MOLYBDENUM DISILICIDE MATRIX COMPOSITE

This is a Division of application Ser. No. 07/362,112 filed 06/05/89, now U.S. Pat. No. 4,927,792.

BACKGROUND OF THE INVENTION

This invention relates to the art of materials science and, more particularly, to nonmetallic materials such as ceramic and intermetallic materials. This invention is the result of a contract with the Department of Energy (Contract No. W-7405-ENG-36).

Ceramic materials have certain outstanding properties, such as high temperature strength, resistance to thermal shock, fatigue resistance, corrosion resistance, low density, and low thermal expansion, which make them attractive materials for high temperature applications. For instance, if ceramics can be used as engine components, an engine could be run at a higher temperature, and thus be much more efficient than it could be with metal components. This has sparked a great deal of interest in studying various ceramics for these types of applications.

Ceramics differ from metals in one very important aspect; they do not show any yield upon loading. The lack of a stress-relieving characteristic, which gives ceramics their brittle nature and low tolerance for flaws, is a major drawback to using them in structural applications. One of the methods of dealing with this mechanical characteristic, which can be referred to as lack of fracture toughness, is the development and use of ceramic composites, which are ceramics having another material, usually a fiber, dispersed throughout them. Mechanisms which may act when ceramics are made tougher by addition of fibers of a different material include the transfer of load from the matrix to the fiber based on elastic modulus, microcracking or prestressing due to a difference in thermal expansion, crack deflection, and phase transformation toughening.

However, the problem is only partially solved; ceramic composites are still subject to brittle failure. There is a class of materials which offers the advantages of a ceramic and certain of the beneficial mechanical characteristics of a metal. These materials are intermetallics, which at high temperature have the excellent properties of a ceramic, but mechanically behave more like a metal, since they show yielding and stress-relieving characteristics.

Molybdenum disilicide ($MoSi_2$) is an intermetallic compound which has potential for structural use in oxidizing environments above 1200° C. It possesses a melting point of 2030° C. and its oxidation resistance at high temperature is very good. Mechanically, $MoSi_2$ behaves as a metal at high temperatures, since it undergoes a brittle-to-ductile transition at approximately 1000° C. Thus, $MoSi_2$ has a stress-relieving characteristic at high temperatures. The major problems impeding the use of $MoSi_2$ as a high temperature structural material (potential use temperatures in the range of 1200°-1800° C.) are its relatively low strength at high temperatures and its brittleness at low temperatures. At low temperatures, strength is limited by brittle fracture, while at high temperatures, it is limited by plastic deformation or creep. For this material to be a viable structural material at high temperatures, both its elevated temperature strength and its room temperature fracture toughness must be improved. Fracture toughness may be defined as resistance to fracture.

Silicon carbide whiskers made by a vapor-liquid-solid (VLS) process have been used to reinforce $MoSi_2$. This use resulted in improved ambient temperature fracture toughness and a near doubling of strength at 1200° C. (compared to room temperature strength). However, the improvement in strength is not enough. The present invention is the use of whiskers of a different size made by a different process, a vapor-solid (VS) process, as a reinforcing material.

The two $MoSi_2$ composites which are discussed herein, the inventive composite and the prior art composite, are reinforced with 20 vol % of either VLS beta-SiC whiskers made at Los Alamos National Laboratory or VS beta-SiC whiskers purchased from J. M. Huber Corporation of Borger, Tex. and designated Huber $XPW_2$ whiskers. SiC whiskers are minute, high-purity, single crystal fibers. They have very high stiffness in the longitudinal direction, in which they are grown. The main difference between the two whisker types used is their size. In hot-pressed shapes of VLS reinforced $MoSi_2$, the VLS whiskers were about 100 to 200 microns long, about 3 to 15 microns in diameter, and had an aspect ratio ranging from about 20:1 to about 30:1. VS whiskers in hot-pressed shapes were from about 1 to about 5 microns in length, had a diameter of from about 0.1 to about 0.5 micron, and had an aspect ratio of from about 5:1 to about 15:1. A few VS whiskers were 100 to 200 microns long in the as-purchased condition, but were broken down to less than 5 microns long during dry blending with $MoSi_2$ powder.

SUMMARY OF THE INVENTION

This invention is a composition consisting of an intermetallic compound, molybdenum disilicide, which is reinforced with VS silicon carbide whiskers dispersed throughout it and a method of making the reinforced composition. Use of the reinforcing material increases fracture toughness at low temperatures and strength at high temperatures, as compared to pure molybdenum disilicide. Yield strength of the inventive composite at 1400° C. is almost five times that of pure $MoSi_2$ while low temperature fracture toughness is significantly improved, through it does not equal the low temperature improvement obtained with VLS whiskers. It is surprising that use of whiskers which are smaller in diameter and length provides an increase in strength compared with reinforcement by means of large whiskers.

Since $MoSi_2$ behaves like a metal at high temperatures, it is believed that its deformation mechanism is dislocation plasticity, where dislocations, or flaws in the atomic structure, are caused to move by an applied stress, thus producing macroscopic deformation. It is believed that whiskers pin dislocations, that is, make the dislocation more difficult to move, so that the stress required to move them is larger; this increases macroscopic strength. Since there are more of the VS (smaller) whiskers than of the VLS (larger) whiskers in a particular volume of material, the mean free path between whiskers is less for the VS whiskers. This means that dislocations are more effectively pinned, making the material stronger.

In a broad embodiment, this invention is a method of making a composition of matter consisting of molybdenum disilicide reinforced with silicon carbide whiskers dispersed throughout it, where each whisker is a single crystal having an aspect ratio of from about 5:1 to about 15:1, and where the dimensions of each whisker are from about 1 to about 5 microns long and from about 0.1 to about 0.5 micron in diameter, said method comprising: mixing molybdenum disilicide powder and said silicon carbide whiskers to form a substantially homogenous mixture; applying pressure to said mixture and increasing the pressure on said mixture until a peak pressure is reached; applying heat to said mixture until a peak temperature is reached; holding said mixture at about said peak pressure and said peak temperature for a time period to form a coherent shape; decreasing the pressure applied to said coherent shape to atmospheric pressure and cooling said coherent shape to ambient temperature; and recovering said coherent shape.

BRIEF DESCRIPTION OF THE DRAWING

The Drawing shows variation with temperature of the high-temperature yield strengths (room temperature values are ultimate strengths) of the inventive composition in comparison to unreinforced $MoSi_2$ and a $MoSi_2$—VLS SiC whisker composite.

DETAILED DESCRIPTION OF THE INVENTION

In earlier work, $MoSi_2$ has been reinforced with VLS SiC whiskers, which resulted in improved fracture toughness at room temperature and improved strength at elevated temperatures. VLS whiskers are large relative to the $MoSi_2$ matrix grain size and provide toughening mechanisms such as crack deflection at room temperature and some resistance to pullout at high temperatures. However, further improvement is needed if $MoSi_2$ is to be a useful material for engineering applications at high temperatures. It was decided to study the use of much smaller whiskers for reinforcement of $MoSi_2$. The theory behind the use of smaller whiskers was to improve the elevated temperature strength of the composite by decreasing the mean free path between the reinforcing fibers.

It has been found that a decreased mean free path between whiskers due to use of the smaller VS whiskers for reinforcement, instead of VLS whiskers, increases the high temperature strength of reinforced $MoSi_2$ by a factor of two. It is believed that the reason for this is that at elevated temperatures the mode of failure of $MoSi_2$ is dislocation plasticity; the small VS whiskers act in a dispersion strengthening mechanism to inhibit dislocation motion. Since there is little or no dislocation motion in $MoSi_2$ at room temperature, the small whiskers effected only modest improvement in fracture toughness at room temperature. The larger VLS whiskers are much better suited for the typical ceramic toughening mechanisms such as crack deflection.

A high percentage of the VS whiskers used in the experimentation were not normal straight whiskers, but were irregularly shaped, or bent. However, this should have no effect on the experimental results, since the strengthening mechanism does not depend on whisker shape. The VLS whiskers used included a very small amount of particulate due to the method of harvesting.

The high temperature oxidation resistance of $MoSi_2$ is one of its most attractive properties. Its oxidation resistance in the 1000°-1700° C. range is due to formation of a silica ($SiO_2$) layer on its surface which functions as a protective film. $MoSi_2$ is used as a resistance heating element in industry for temperatures up to about 1750° C. In the range of 300° to 600° C., there exists a region where $MoSi_2$ can be completely disintegrated by a oxidation process involving molybdenum trioxide ($MoO_3$). The process is highly dependent on the microstructure and occurs only through the pore channels in the $MoSi_2$. Therefore the problem is a function of porosity, and if the porosity can be controlled, the problem is eliminated. There is no reaction between $MoSi_2$ and SiC, even at temperatures up to the melting point of $MoSi_2$.

The procedure for making the $MoSi_2$ composites was the same for both VS and VLS whiskers. The materials used were 99.9% pure $MoSi_2$ powder (obtained from Alfa Products of Danvers, Mass) and 20 vol % of whiskers. It is believed that use of less than 10 vol % whiskers will not yield a sufficiently strong material and that up to about 30 vol % can be used. The powder and whiskers were weighed out after calculating the required weight by reference to densities and blended dry for one minute in a small high-speed blender similar to a coffee grinder. The mixture was then placed in a Grafoil ® lined die for hot-pressing into disks measuring approximately 31.8 mm in diameter by 6.35 mm thick.

Hot-pressing was performed in argon and temperatures were measured optically. A load of 30.5 MPa (4.429 ksi) was applied as the increasing temperature reached 1200° C. Press movement usually stopped when the temperature was about 1700° C., at which point heating was stopped and a hold period started. Hold times at the peak temperature of about 1700° C. were about 5 minutes and then slow cooling was started, though it may be desirable to use longer hold times of up to about one hour. When the decreasing temperature reached 1200° C., the load was slowly removed and the sample allowed to cool to room temperature.

Densities of the hot pressed composites were very good, ranging between 97% and 98.4% of theoretical, which is 5.691 g/cm$^2$. Photomicrographs of the inventive composite show whisker clumps aligned in a plane perpendicular to the hot-pressing direction. It is apparent that these clumps of whiskers act as flaws, since they trap voids within the clusters. A larger increase in room temperature strength should be observed upon elimination of these clumps. Strength at high temperatures is not as sensitive to these pockets of flaws.

Four-point bend tests are a method for determining the strength of a material in a relatively simple and inexpensive manner. This type of test requires compressive loading, which allows the test to be easily run at high temperatures. A chevron notch fracture test may be used to measure fracture toughness. It has the advantages that the test member is relatively easy to machine, no precracking is required, and no crack length measurements are required. Note that strengths of ceramics may vary widely in accordance with the type of test used to determine strength. The test equipment, methods of conducting tests, and the equations used to solve for strength and fracture toughness are known to those skilled in the art.

Test members in the shape of rectangular bars having the dimensions 3.8×5.08×25.4 mm long were machined from the hot pressed disks. In the strength tests, two load points on a 5.08 mm wide face of the test member were 9.5 mm apart and the other two load points on the opposite face were 19.0 mm apart. The load point spacing for the fracture toughness tests were the same but the loads were applied to the 3.8 mm wide faces of the test member, rather than a 5.08 mm wide face. The width of the notch for the fracture toughness tests was 0.25 mm and material was machined away leaving a V shape with the point of the V being 1.02 mm away from the narrow face of the bar, such that the height of the V was 4.06 mm. The width of the V was 3.81 mm.

Each of the tests was duplicated several times and the results reported in the Tables are average of several tests. During the high temperature tests, the test members were soaked at temperature for about ½ hour, until the strain due to thermal expansion decreased to below 1% of the total strain. The test members were loaded using a constant strain rate of 0.025 mm/min.

Table I presents ultimate flexure strengths as measured by four-point bend flexure tests of unreinforced $MoSi_2$, $MoSi_2$ with VLS whiskers, and $MoSi_2$ with VS whiskers in megapascals and thousands of pounds per square inch. Elevated temperature ultimate bend strengths of the composites are approximate values because of plasticity of the materials at high temperatures. At room temperature, the inventive composite has about twice the strength of unreinforced $MoSi_2$. At 1200° C., the inventive composite has over twice the strength of $MoSi_2$ reinforced with VLS whiskers. There is no data point for VLS-reinforced $MoSi_2$ at 1400° C. because the tests on the VLS-reinforced material were done at an earlier time than the tests on the VS-reinforced material.

TABLE I

| | ULTIMATE STRENGTH | | |
|---|---|---|---|
| Temp., °C. | $MoSi_2$ MPa (ksi) | $MoSi_2$ + VLS MPa (ksi) | $MoSi_2$ + VS MPa (ksi) |
| 22 | 150 (21.75) | 310 (44.96) | 283 (41.04) |
| 1200 | — | 270.3 (39.21) | 556.3 (80.68) |
| 1400 | — | 13 | 306 (44.38) |

Since $MoSi_2$ displays creep and stress relaxation at high temperatures, it is necessary to determine yield strength. Table II presents 0.2% offset yield strength. Offset yield strength is defined as the stress corresponding to the intersection of the stress-strain curve and a line parallel to the elastic part of the curve offset by a specified strain. Unlike the ultimate strength values, these yield strengths are exact in value.

The Drawing is based on room temperature ultimate strengths from Table I and high temperature yield strengths from Table II.

TABLE II

| | 0.2% OFFSET YIELD STRENGTH | | |
|---|---|---|---|
| Temp., °C. | $MoSi_2$ MPa (ksi) | $MoSi_2$ + VLS MPa (ksi) | $MoSi_2$ + VS MPa (ksi) |
| 1200 | 138.8 (20.1) | 247.4 (35.9) | 386.2 (56.01) |
| 1300 | — | — | 158.8 (23.05) |
| 1400 | 18.6 (2.7) | 42.9 (6.2) | 87.5 (12.69) |
| 1500 | 7.73 (1.12) | — | — |

Table III reports fracture toughness at room temperature. As mentioned above, reinforcement with VLS whiskers provides better fracture toughness than use of VS whiskers. However, the increase exhibited by VS whisker-reinforced $MoSi_2$, in comparison to unreinforced $MoSi_2$, is significant and VS whiskers provide much better high temperature strength than VLS whiskers.

TABLE III

| FRACTURE TOUGHNESS | | |
|---|---|---|
| $MoSi_2$ MPa-m$^{0.5}$ (ksi-in.$^{0.5}$) | $MoSi_2$ + VLS MPa-m$^{0.5}$ (ksi-in.$^{0.5}$) | $MoSi_2$ + VS MPa-m$^{0.5}$ (ksi-in.$^{0.5}$) |
| 5.32 (4.83) | 8.20 (7.45) | 6.82 (6.20) |

It is helpful to review the strengthening and toughening mechanisms acting in ceramic composites in determining why the use of VS whiskers provides improvement over VLS whiskers. The same mechanisms operate with respect to intermetallic composites in the brittle state. Fibers or whiskers are usually added to improve the fracture toughness of a ceramic, not its strength. This is because the strength of ceramics is high but is not reliable. It is reliability, which is associated with fracture toughness, that one would like to improve. In ceramics, resistance to fracture cannot be provided, as in metals, through the movement of dislocations, since this movement does not normally occur. Toughening can be accomplished by changing the microstructure of a ceramic so that resistance to fracture is provided by the microstructure, thus reducing the stress at the tip of a crack.

A mechanism of strengthening of a composite reinforced with fibers is load transfer. This type of strengthening is based on the fact that a low modulus matrix transfers all of the load to high modulus fibers. The matrix also serves to protect the fiber. However, since the Young's modulus of many ceramic matrices are typically on the same order as the modulus of the fibers which would reinforce them, the load transfer model has limited value.

Most toughening mechanisms in ceramics modify the ceramic microstructure so as to reduce the stress field around and in front of the tip of a crack. These mechanisms include phase transformation, crack branching, crack bowing, crack deflection, crack bridging, whisker pullout, debonding of fibers in the stress field of the crack, and property mismatches in thermal expansion and elastic modulus.

Prestressing of a matrix and fibers is achieved by means of differences in the thermal expansion of the fiber and the matrix. It is desired to have the fiber in tension and the matrix surrounding the fiber in compression. Compressive stresses decrease as the cube of the distance from the fiber surface and so this mechanism requires a high density of uniformly spaced fibers, or a small mean free path.

The inclusion of a ductile crack-impeding second phase, such as cobalt-bonded tungsten carbide, is a highly effective toughening mechanism. However, normal candidates for these ductile metal fibers are not sufficiently refractory for many processes and applications.

Phase transformation toughening results from stress-induced phase transformation of particulate inclusions in a ceramic matrix. The most commonly used particle is partially stabilized tetragonal zirconia. Toughening occurs mainly as a result of an expansion in volume of tetragonal zirconia particles as they are transformed to the monoclinic form. Residual stresses surround the particle after the transformation, which act to decrease the stress field at the crack tip.

Microcracking is the result of the combined effect of stresses developed at grain boundaries due to thermoelastic anisotropy. Mismatches in thermal expansion are the most common causes of microcracking, but mismatches due to phase transformation and elastic modulus can also contribute. Stresses arising from the main crack can nucleate microcracks away from the main crack. Crack propagation proceeds by a process of linkage between the main crack and the microcracks.

Crack bowing occurs when sections of cracks are pinned by the microstructure, or by second-phase inclusions in the solid. The free faces of the crack front then bow around the pinning sites, and join up on the other side of these sites.

Crack deflection and whisker pullout are two mechanisms which have been observed in the $MoSi_2$—SiC whisker system. Crack deflection can occur by deflecting along fiber-matrix interfaces, possibly leading to fiber pullout. Pullout is normally important at elevated temperatures. Pullout requires a weak bond strength between the matrix and the fiber. This bond strength, sometimes very high in ceramic composites, can be altered with the use of fiber coatings such as carbon. The crack may also branch into two paths around or through a particle or fiber due to the orientation of preferred fracture surfaces, such as grain boundaries or cleavage planes.

Grain size, which can be affected by the addition of reinforcement, is a factor in crack deflection. Other factors are the volume fraction and shape of the reinforcement. Small aspect ratio whiskers will improve the toughness, due to pullout and bridging, and large aspect ratio whiskers will improve crack deflection characteristics. The increase in toughness due to crack deflection is highest for rods of high aspect ratio, followed by discs and then spheres.

Most ceramic composites involve more than one toughening mechanism and in many composites there is no dominant mechanism. The successful ceramic composite design will take advantage of this fact.

Load transfer is a plausible model for high temperature strengthening by VLS whiskers, but it is not plausible for high temperature strengthening by VS whiskers. This is because of whisker size. The load transfer model was developed for continuous fibers, and while the VLS whiskers are not continuous, the VS whiskers do not even approach the requirements for this model. VLS whiskers are at least twenty times longer than the VS whiskers; they have an aspect ratio of about 10:1, whereas VLS whiskers have an aspect ratio of about 20 to 30:1. The important point is that the load transfer model requires a critical aspect ratio for optimum strengthening. This was calculated to be 12 for the purely elastic case, and 53 for the plastic case. The VS whiskers are much shorter, relative to the grain size of $MoSi_2$, and also have a smaller aspect ratio; therefore, they are not long enough to provide adequate strengthening due to load transfer.

What is the strengthening mechanism which can account for a factor of five increase in strength in the VS whisker composite at 1400° C.? A mechanism that comes to mind is dispersion strengthening. The reason that this seemingly nontraditional ceramic composite strengthening mechanism has been proposed will become apparent from the following paragraphs.

$MoSi_2$ undergoes substantial deformation during fracture at and above 1200° C. Normally, the fracture behavior of ceramics is very different from that of metals. Ceramics behave in a brittle manner, as does $MoSi_2$ at room temperature. Neither the strength nor toughness of ceramics is controlled by dislocation motion, as with metals, because dislocations are either immobile or are not mobile on enough slip systems to influence toughness. Therefore, ceramics are made tougher by modifying the microstructure and providing resistance to fracture via the microstructure itself, not by the movement of dislocations.

This reasoning cannot be applied to the behavior of $MoSi_2$ at high temperature. Therefore, a different way of viewing fracture in $MoSi_2$ must be used to fully understand its behavior and how to control it. It is believed that the mode of fracture in this system at high temperature is plastic deformation through dislocation motion.

Very often, in a two phase system such as this, an indication of grain boundary sliding, or diffusional creep, is large void formations at boundaries between the two phases. There is no evidence of void formation at the grain boundaries, though SEM studies were done. There is also no decrease in grain size with the addition of the SiC whiskers, which would increase the effects of grain boundary sliding.

It is believed that the deformation of the composites is due to classical dislocation plasticity, rather than grain boundary sliding or diffusional creep. Transmission electron microscopy is presently being performed on samples to further describe this dislocation plasticity and to provide more direct evidence to support this belief.

An explanation for the dramatic increase in strength of the VS whisker composite over the VLS whisker composite follows from the model of dislocation plasticity. The mean free path is smaller for the VS whisker composite than for the VLS whisker composite and thus strengthening due to dispersion strengthening is more effective. The VS whiskers are acting as "pinning agents" to control the dislocation motion. The degree of strengthening resulting from second-phase particles depends on the distribution of particles in the ductile matrix. For a constant volume fraction of reinforcement, a decrease in reinforcement size will decrease the average distance between the reinforcing particles, or the mean free path. One of the reasons for adding VS whiskers, as compared to VLS whiskers, is to reduce the mean free path. Though most particle dispersion models are based on spherical particles, rods and plates strengthen about twice as much as spherical particles, at the same volume fraction. VS whiskers can be thought of as small rods, which satisfies the geometry for a more optimal strengthening. A fine particle acts as a barrier to dislocations by requiring the dislocation cut to pass through it, thus requiring a large amount of stress, or a particle can resist the dislocation path altogether, forcing the dislocation to bypass the particle.

The VLS whisker composite, as would be expected from this analysis, showed a decrease in strength at 1200° C., compared to room temperature. This is because the large whiskers are ineffective for controlling dislocations, since the mean free path is very large relative to the matrix grain size.

Strength at room temperature is very much dependent on porosity of the sample, because there is no plastic deformation. Porosity of the VS samples was fairly high within the large clumps of whiskers, as mentioned above. These large whisker clumps acted as large flaws, causing a decrease in room temperature strength of the VS composites. If these large clumps can be dispersed, both the strength and fracture toughness will be improved, especially at room temperature. It is not the clumps of whiskers themselves, but rather the porosity within these clumps which reduces room temperature strength. Elevated temperature strength is not as sensitive to these pores. A wet-blending process could be used to avoid formation of clumps, resulting in a composite with better mechanical characteristics.

The relatively low strength of the VLS composite at room temperature is also due to pores, but in this case the pores surround individual whiskers, since these whiskers are large relative to the VS whiskers and relative to the $MoSi_2$ grain size, which is typically 5 to 10 microns. The matrix cannot transfer load to a whisker if there are gaps between the matrix and the whisker. This must reduce the material's strength.

Therefore, the VLS whiskers provide a greater amount of toughening at low temperatures than the VS whiskers because they are longer, have a much larger diameter, and provide a larger obstacle to the propagating crack. The size of the VS whisker is suited for controlling dislocation motion, but cannot provide as much toughening as the VLS whiskers do at room temperature, when there is no dislocation plasticity.

When the whisker is surrounded by the matrix, the bond is normally very strong. A strong bond is good for strengthening of many metal and polymer composites, but too strong a bond is not good for the toughness of most ceramic composites, since most reinforcements have a modulus on the same order as the matrix. Therefore, the propagating crack would not be deflected, or the whisker would not show any debonding or pullout, if the bond strength was too high. VLS whiskers do provide a fair amount of whisker pullout at high temperatures. However, the VLS composite at this temperature was not as strong as the VS composite because it was not stopping dislocation plasticity.

Utilizing a smaller whisker and thus a shorter mean free path causes a dramatic increase in high temperature strength; a similar effect should be attained by addition of fine SiC powder instead of whiskers. Since VLS whiskers provide better fracture toughness at room temperature than VS whiskers, a composite consisting of $MoSi_2$ with VLS SiC whiskers and fine SiC powder should result in excellent strength and fracture toughness at both room temperature and high temperature.

In attempts to eliminate the clumps of whiskers discussed above, a wet processing method was developed. The first step in the wet processing method is to subject the VS whiskers to a separation process to remove agglomerations of whiskers. In the experimental work accomplished to date, in which the following sedimentation process was used, whiskers were dispersed in deionized water at a pH of about 9.5. The pH can be adjusted by use of any common base and/or acid, such as sodium hydroxide, ammonium hydroxide, and hydrogen chloride. Experimentation in which the pH is varied has not been accomplished, but it is believed that values on the alkaline side will be satisfactory with desired values being above about 9.5. The amount of water used was large compared to the quantity of whiskers. About 300 ml of water per 1 g of whiskers was used, which is equivalent to 0.33 wt % of whiskers in water. However, the amount of water used per unit of whiskers is not critical and may vary greatly.

Dispersion of the whiskers may be accomplished by stirring, but in order to increase the yield of usable whiskers, it is believed desirable to provide a high degree of agitation to the whisker-containing water. In our experimentation, high shear homogenation, by means of an appropriately configured agitator, and sonification were used. After dispersion and agitation, the water-whisker slurry was allowed to stand for about five minutes in order to allow agglomerations of whiskers to settle to the bottom of the vessel containing the slurry. The supernatant, which contained whiskers in suspension, was recovered by decantation. The supernatant was allowed to stand for about 24 hours and then the liquid was drained from the whiskers, thus completing the sedimentation process. The duration of the settling periods may vary widely from the five minutes and 24 hours used; the solutions must stand for a sufficient period to effect the necessary separations. The whiskers were then dried by means of an oven at a temperature above 100° C. or by exposure to the atmosphere without heating, though this drying step may not be necessary.

A slip solution containing the dried whiskers and $MoSi_2$ powder in water was prepared. The solids loading of the slip is not critical, but is preferably from about 40% to about 65 wt % solids. Deionized water having a pH adjusted to 9.5 or above is used in the slip solution. The slip is cast into a plaster of paris mold and allowed to set, which required about one minute. The casting was dried in air or in an oven and then crushed and milled to yield a powder suitable for hot-pressing. In our experimentation, the powder was reduced to a size which would pass through a 10 mesh screen.

The powder was then hot pressed as described above. The average pressed density obtained at 1700° C. and 4.6 ksi was 5.39 $g/cm^3$ or 94.7% of theoretical density. Micrographic examination revealed no whisker clumps. Though testing of the composites made by this wet process has not been accomplished, it is expected that strength and fracture toughness will be improved by the elimination or reduction of the clumps of whiskers achieved by this wet processing technique.

Those skilled in the art will appreciate that the above-described wet processing method may be varied and that the essence of the method is removing agglomerated whiskers and efficiently mixing the non-agglomerated whiskers with $MoSi_2$ to obtain a substantially homogenous mixture for hot pressing.

Experiments were conducted in which the water-whisker slurry was stirred and sonified and immediately cast into a mold. The dried powder from this procedure was hot pressed. Clumps were present in the composite.

What is claimed is:

1. A method of making a composition of matter consisting of molybdenum disilicide reinforced with silicon carbide whiskers dispersed throughout it, where each whisker is a single crystal having an aspect ratio of from about 5:1 to about 15:1, and where the dimensions of each whisker are from about 1 to about 5 microns long and from about 0.1 to about 0.5 micron in diameter, said method comprising:
   a. mixing molybdenum disilicide powder and said silicon carbide whiskers to form a substantially homogenous mixture;
   b. applying pressure to said mixture and increasing the pressure on said mixture until a peak pressure of about 30.5 MPa is reached;
   c. applying heat to said mixture until a peak temperature of about 1700° C. is reached;
   d. holding said mixture at about said peak pressure and said peak temperature for a time period of from about 5 minutes to about 1 hour to form a coherent shape;

e. decreasing the pressure applied to said coherent shape to atmospheric pressure and cooling said coherent shape to ambient temperature; and f. recovering said coherent shape.

2. The method of claim 1 where said whiskers are present in an amount of from about 10 to about 30 volume percent.

3. The method of claim 1 where said whiskers are processed before mixing with said molybdenum disilicide powder, said processing being comprised of separating the whiskers into a fraction comprised substantially of non-agglomerated whiskers and a fraction comprised substantially of agglomerated whiskers, where only said non-agglomerated whiskers are mixed with the molybdenum disilicide.

4. The method of claim 3 where said separation is accomplished by:

a. dispersing said silicon carbide whiskers in water;

b. agitating the resulting water-whisker slurry;

c. separating said slurry into a first fraction comprising agglomerated whiskers and a second fraction comprising non-agglomerated whiskers in water; and d. drying said second fraction to obtain non-agglomerated whiskers to mix with said molybdenum disilicide.

5. The method of claim 4 where said water in which whiskers are dispersed has a pH of about 9.5.

6. The method of claim 1 where mixing said silicon carbide whiskers and said molybdenum disilicide powder is accomplished by:

a. mixing whiskers and powder and water;

b. casting said aqueous mixture in a mold;

c. drying said casting; and d. treating said dried casting to reduce it to a powder suited for hot-pressing.

* * * * *